J. S. GREENE.
WEB GUIDE FOR PHOTOGRAPHIC CAMERAS.
APPLICATION FILED MAR. 7, 1912.
1,153,843.
Patented Sept. 14, 1915.
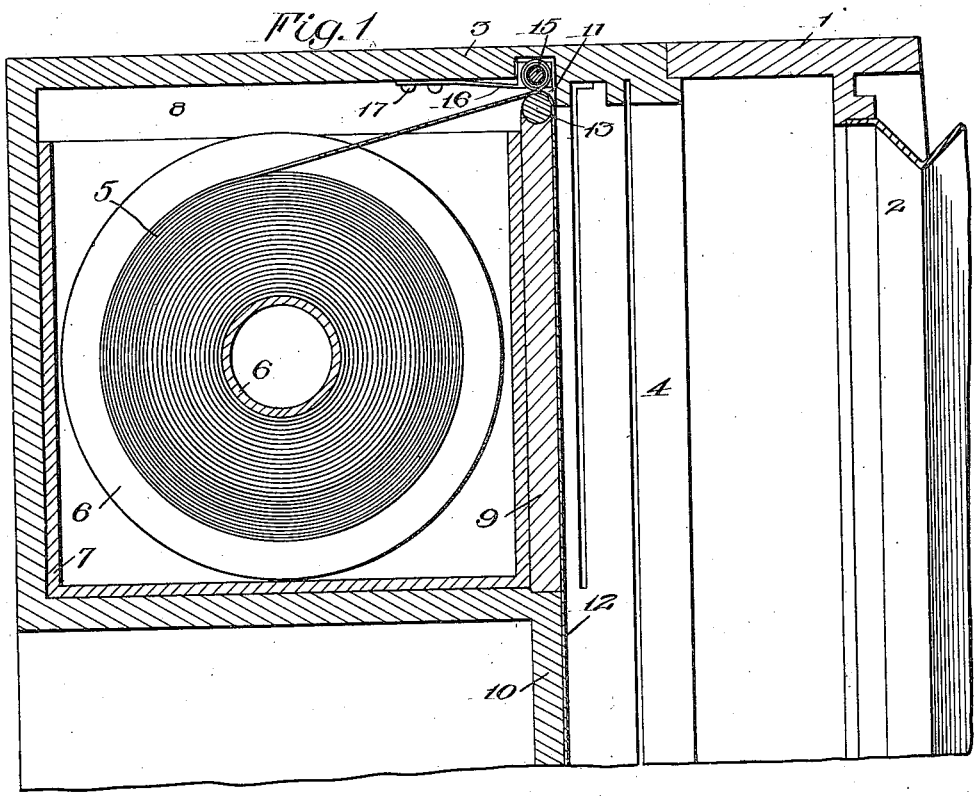
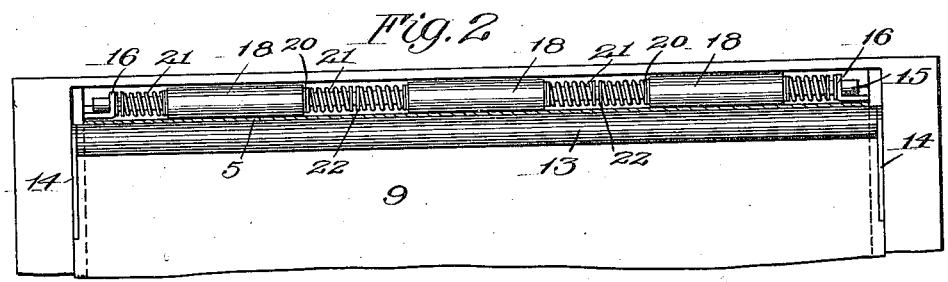
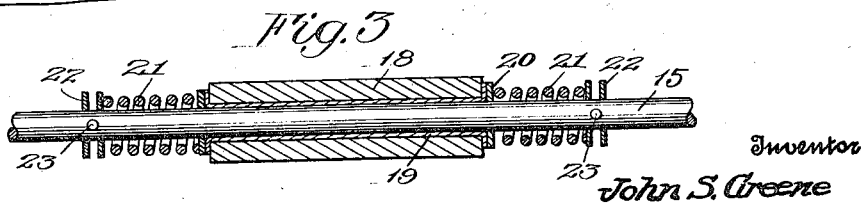
Inventor
John S. Greene

UNITED STATES PATENT OFFICE.

JOHN S. GREENE, OF ROCHESTER, NEW YORK, ASSIGNOR TO COMMERCIAL CAMERA COMPANY, OF PROVIDENCE, RHODE ISLAND, A CORPORATION OF RHODE ISLAND.

WEB-GUIDE FOR PHOTOGRAPHIC CAMERAS.

1,153,843.

Specification of Letters Patent.   Patented Sept. 14, 1915.

Application filed March 7, 1912.   Serial No. 682,194.

*To all whom it may concern:*

Be it known that I, JOHN S. GREENE, of Rochester, in the county of Monroe, and State of New York, have invented certain new and useful Improvements in Web-Guides for Photographic Cameras; and I do hereby declare the following to be a full, clear, and exact description of the same, reference being had to the accompanying drawings, forming a part of this specification, and to the reference-numerals marked thereon.

My present invention relates to photography and more particularly to photographic cameras, and has for its object to improve the guiding means for the sensitized web of film or paper in cameras of the roll holding type, the improvements being directed toward making provision whereby the web is prevented from wrinkling or creeping laterally out of its proper path of travel.

To these and other ends the invention consists in certain improvements and combinations of parts, all as will be hereinafter more fully described, the novel features being pointed out in the claims at the end of the specification.

In the drawings: Figure 1 is a sectional view through the roll holding portion of a camera taken transversely of the focal plane, the said camera being provided with a web guide constructed in accordance with and illustrating one embodiment of my invention; Fig. 2 is a front elevation of the guide, and Fig. 3 is a longitudinal section of one of the guiding rolls.

Similar reference numerals throughout the several figures indicate the same parts.

The present embodiment of my invention was designed for use more particularly in connection with a camera having a web feeding device, such as that disclosed in the application of Gilbert S. Dey, filed May 2, 1910, for patent on strip feeding devices for cameras, Serial No. 558,782, and I have, therefore, illustrated herein a portion of such a camera embodying, as to its general features, a body 1, bellows 2, and a roll holder casing 3 coöperating with the body to provide the exposure chamber 4.

The roll 5 of sensitized material, whether film or paper, is wound upon a spool 6 suitably journaled in a box or receptacle 7 which preferably fits closely and movably within a roll chamber 8 at the top of the casing 3 that is closed by a door 9. This door 9 in conjunction with a wall 10 of the casing 3 forms a support for that portion of the sensitized web that is being exposed when the latter is in the focal plane. The web is drawn from the roll 5 through a light tight opening 11 at the top of the door 9 and thence downwardly at 12 by any suitable winding means and after each exposure a fresh expanse of the web is exposed in the focal plane in this way.

It is in the region of the opening 11 that I provide my guiding means which consists, in the present instance, of what I term an under roll 13 that takes the strain of the winding force as exerted by the pressure of the taut web thereon and which is disposed transversely of the direction of travel of the web. This roll has a preferably continuous surface and is suitably journaled on the door 9 at its ends, as by the provision of small plates 14 on the edges of the door.

Extending parallel with the roll 13 and above the same in the present instance is a shaft 15 that is journaled at its ends in vertical yielding bearings provided, in this embodiment, at the ends of the spring arms 16 secured at 17 to the top of the casing 3 and the chamber 8, while mounted on this shaft to turn freely are a plurality of relatively short, spaced rolls 18. These rolls 18 are independently revoluble and also have an independent longitudinal or axial sliding movement on the shaft and they bear upon the top or opposite side of the web from the roller 13, being held in engagement with the web, or with the other roll by the action of the spring bearing arm 16.

The short rolls are preferably made of rubber and are hence provided with bushings 19 and with washers 20 at the ends of the bushings. Engaging the washers 20 at each end of each roll is a spring 21 coiled about the shaft 15 and acting at its opposite end against a washer 22 that lies against a pin or abutment 23 on the shaft, which is spaced from the roller. The normal position of the latter is, therefore, an intermediate one relatively to the abutments 23 in which it is held by the neutralization of one spring action against the other.

In the operation of the device, the web is fed, as before indicated, passing over the under roll 13, but if this roll was the only one provided it will be seen that there would be a tendency at times for the web to creep longitudinally thereof due, perhaps, to the uneven winding of the roll 5, inequalities in the stretching of the web or unequal winding tension at its opposite edges. With the rolls 18, however, bearing with good frictional engagement upon the opposite side of the web, the latter in creeping must move these rolls longitudinally in the same direction or one or more of them which it would have to do against the increasing tension of one of the springs 21. Therefore, even though the web succeeds in doing this, such spring 21 is constantly tending to urge it back into its proper and normal path, and ultimately succeeds in doing so by continuous gentle pressure and without causing wrinkling.

I claim as my invention:

1. In a web feeding device for photographic cameras, the combination with a shaft, of a plurality of guiding rolls mounted to turn thereon in engagement with the web and adapted to slide longitudinally of the shaft and a plurality of springs disposed on opposite sides of the rolls to yieldingly resist such longitudinal movements of the latter.

2. In a web feeding device for photographic cameras, the combination with a shaft, of a plurality of guiding rolls mounted to turn thereon in engagement with the web and adapted to slide longitudinally of the shaft, an abutment on the shaft at each end of each roll and a spring coiled about the shaft between each abutment and the end of the aujacent roll to yieldingly resist movement of the latter longitudinally of the shaft.

3. In a web feeding device for photographic cameras, the combination with a continuous surfaced under guide disposed transversely of the direction of travel of the web and over which the latter is passed, of a plurality of alined guiding members arranged in parallelism with the under guide to bear against the opposite side of the web therefrom, said members being adapted to yield toward and from each other, and means for resiliently resisting such yielding movements.

JOHN S. GREENE.

Witnesses:
G. WILLARD RICH,
LUCY A. VAN COURT.